United States Patent Office 3,062,864
Patented Nov. 6, 1962

3,062,864
M-(1-METHYLBUTYL)PHENYL N-METHYL-CARBAMATE
Joseph N. Ospenson, Concord, Gustave K. Kohn, Berkeley, and Joseph E. Moore, Pinole, Calif., assignors to California Research Corporation, San Francisco, Calif., a corporation of Delaware
No Drawing. Filed June 8, 1959, Ser. No. 818,565
1 Claim. (Cl. 260—479)

This invention relates to a new compound; namely, m-(1-methylbutyl)phenyl N-methylcarbamate and its use as a cholinesterase inhibitor in agricultural pesticide formulations.

One of the ultimate criteria relating to the effectiveness of certain agricultural pesticides which function as digestive and/or contact toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely m-(1-methylbutyl)phenyl N-methylcarbamate, whose anticholinesterase activity is markedly superior to one of its homologs which is recognized as one of the most active carbamate esters previously known. In fact, the cholinergic activity of the invention compound is of the order of ten times greater than the activity of its homolog; namely, m-t-butylphenyl N-methylcarbamate. This outstanding activity as a cholinesterase inhibitor accentuates its effectiveness as an agricultural pesticide and particularly its application as a digestive and/or contact toxicant for the purpose of inhibiting the cholinesterase function in the cold-blooded animal parasites such as insects, mites, nematodes, arachnids, etc.

The invention compound m-(1-methylbutyl)phenyl N-methylcarbamate, which is definitive of the following structural formula,

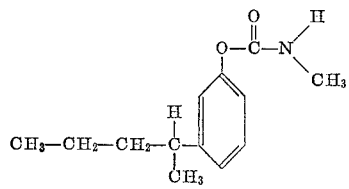

may be prepared (1) by reacting m-(1-methylbutyl)phenol with methylisocyanate or (2) by reacting m-(1-methylbutyl)phenol or the corresponding metal phenate with phosgene followed by reaction of the resulting intermediate chloroformate with methylamine.

Of particular significance to the production of the subject cholinesterase inhibitor is the particularity of the alkylphenol reactant and its effect on the final carbamate ester composition. Both the meta positioning and the secondary amyl or 1-methylbutyl radical itself have been found essential to achieve the unique cholinergic activity of the resulting carbamate ester. It is furthermore appreciated that, depending on the method of preparing the alkylphenol, there may exist a variation in the composition of the m-(1-methylbutyl)phenol reactant. Such variations include the existence of both ring position and side-chain structural isomers. Accordingly, for optimum cholinergic activity, it is desired to employ a m-(1-methylbutyl)phenol composition which, following reaction to form the carbamate ester, will result in an N-methylcarbamate ester composition containing at least 90 percent by weight of the m-amylphenyl ester of which at least 90 percent by weight consists of the (1-methylbutyl)-phenyl ester. While it is preferable to utilize a substantially pure m-(1-methylbutyl)phenol reactant, it is difficult to separate, with a practical method, the m-(1-methylbutyl)phenol from its isomers in the form of the free phenol. However, the reactions to produce the carbamate ester permit a more facile separation of the undesired isomers and, accordingly, the composition specifications are based on the composition of the final carbamate ester.

One of the methods of preparing the m-(1-methylbutyl)phenol reactant involves the alkylation of a halobenzene with pentene-1, pentene-2, or a normal or a sec. amylhalide in the presence of a Friedel-Crafts catalyst and subsequent hydrolysis of the m-(1-methylbutyl)halobenzene to the corresponding phenol.

The following examples are illustrative of the preparation of the invention compound.

EXAMPLE I

*Preparation of 3(1-Methylbutyl)Phenol*

A total of 448 grams of chlorobenzene and 26.0 grams $AlCl_3$ were charged to a liter flask equipped with an agitator, thermometer, condenser and dropping funnel. 213.2 grams of n-amylchloride were then added dropwise at 20–24° C. over a two-hour period. The resultant deepred solution was quenched in cold dilute HCl and the organic phase separated. This was washed three times with water, dried over $Na_2SO_4$ and the excess chlorobenzene stripped at atmospheric pressure. The residue was then distilled "in vacuo." The desired 1-methylbutyl chlorobenzene was collected at 116–119° at 23 mm. A total yield of 198 grams was obtained.

A high pressure bomb was charged with 150 ml. of the above 1-methylbutyl chlorobenzene, 90 grams NaOH, 6.0 grams $Cu_2Cl_2$ and 1050 ml. of water. This mixture was then heated at 325° C. for six hours. After cooling, the aqueous phase was extracted with ether to remove caustic insoluble materials. It was then acidified, extracted with ether, dried, and the ether removed. The residual oil was distilled under a mechanical vacuum. The desired 1-methylbutylphenol was collected at 85–87° C. at 0.7 mm.

EXAMPLE II

*Preparation of m-(1-Methylbutyl)Phenol N-Methylcarbamate*

37.0 grams of (1-methylbutyl)phenol were dissolved in 50 ml. of water containing 9.0 grams NaOH, and this solution was added all at once to a solution of 26.0 grams of phosgene in 150 ml. of toluene at −20° C. The temperature rose immediately to 30° C. After stirring for 15 minutes, the toluene phase was separated, washed, dried, and stripped.

The resultant oil was distilled and yielded 15 grams of the desired (1-methylbutyl)phenyl chloroformate boiling at 76–81° C. at 0.5 mm.

15 grams of the chloroformate were dissolved in 50 ml. of benzene and 20 ml. of 33% aqueous methylamine were added at ice-bath temperature with good agitation. Upon completion of the reaction, the benzene phase was separated, washed with water, dried and stripped. The remaining oil was distilled "in vacuo" and 10 grams of m-(1-methylbutyl)phenyl N-methylcarbamate were collected at 136–139° C. and 0.5 mm. pressure. The nitrogen analysis was calculated at 6.34%; found, 6.14, 6.07%. The infrared spectrum of the compound indicated a very high meta content with only a negligible amount of para isomer.

In the application of the subject compound as a cholinesterase inhibitor, considerable variation in its formulation may be employed. Thus, m-(1-methylbutyl)phenyl N-methylcarbamate may be applied per se or in combination with other active ingredients in both solid or liquid pesticidal formulations. As an example, m-(1-methylbutyl)phenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of a nonionic or anionic surfactant is added to provide emulsifying and wetting properties. Such liquid concentrates and wettable powders permit easily dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period. The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 moles sodium diethylbariturate, 1.20 moles potassium chloride, and 0.008 moles potassium dihydrogen phosphate per liter adjusted to a pH of 8.0. A stock solution of the candidate inhibitor containing 1 mg./ml. in methanol was prepared. Aliquots were then diluted with water to test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at $25.0° \pm 0.1°C$. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman Model G or equivalent pH meter.

The percent inhibition is then calculated from the pH values obtained for the blank, uninhibited enzyme, and the candidate inhibitor. A curve is then prepared by plotting on semi-logarithmic graph paper the concentration of the inhibitor in gamma/ml. on the log scale versus percent inhibition on the linear scale. The curve will be S shaped. The concentration where the curve crosses the 50 percent inhibition mark is the $I_{50}$ value.

The superior cholinergic activity or cholinesterase inhibition of m-(-1-methylbutyl)phenyl N-methylcarbamate is attested by the following results in comparison with its homolog; namely, m-t-butylphenyl N-methylcarbamate.

| Compound: | $I_{50}$ |
|---|---|
| m-t-Butylphenyl N-methylcarbamate | 0.11 |
| m-(1-methylbutyl)phenyl N-methylcarbamate | 0.018 |

Obviously, many modifications and variations of the invention as hereinbefore set forth may be made without departing from the spirit and scope thereof, and therefore only such limitations should be imposed as are indicated in the appended claim.

We claim:
M-(1-methylbutyl)phenyl N-methylcarbamate.

References Cited in the file of this patent
UNITED STATES PATENTS

| 2,208,485 | Aeschlimann | July 16, 1940 |
| 2,362,508 | Stevens et al. | Nov. 14, 1944 |
| 2,677,698 | Deutschman et al. | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: "Agricultural and Food Chemistry," vol. 2, pages 864–70 (1954).